(12) United States Patent
Davis

(10) Patent No.: US 6,780,956 B2
(45) Date of Patent: Aug. 24, 2004

(54) METHOD OF MAKING SILICONE COPOLYCARBONATES HAVING RANDOM AND BLOCKY SUBSTRUCTURES

(75) Inventor: Gary Charles Davis, Albany, NY (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 10/261,911

(22) Filed: Oct. 2, 2002

(65) Prior Publication Data

US 2003/0065122 A1 Apr. 3, 2003

Related U.S. Application Data

(63) Continuation-in-part of application No. 09/613,040, filed on Jul. 10, 2000, now Pat. No. 6,492,481.

(51) Int. Cl.$^7$ ..................... C08G 77/448; C08G 64/08; C08G 64/18
(52) U.S. Cl. ........................... 528/29; 528/25; 528/204; 525/464
(58) Field of Search ........................... 528/29, 25, 204; 525/464

(56) References Cited

U.S. PATENT DOCUMENTS

| | | |
|---|---|---|
| 3,419,634 A | 12/1968 | Vaughn, Jr. |
| 5,109,076 A | 4/1992 | Freitag et al. |
| 5,530,083 A | 6/1996 | Phelps et al. |
| 6,066,700 A | 5/2000 | Konig et al. |

FOREIGN PATENT DOCUMENTS

| | | |
|---|---|---|
| JP | 9265663 | 10/1997 |
| WO | 0204545 | 1/2002 |

OTHER PUBLICATIONS

English language translation of Japanese patent 9–265663.

*Primary Examiner*—David J. Buttner
(74) *Attorney, Agent, or Firm*—Andrew J. Caruso; Patrick K. Patnode

(57) ABSTRACT

The invention relates to a method of preparing silicone copolycarbonates which incorporate both blocky and random substructures. Such silicone-containing copolycarbonates are useful in the preparation of a variety of molded articles such as optical disks. The structure of the compositions prepared by the method of the invention is determined by the method of preparation used and may be used to control physical properties. The copolymers are prepared by forming in a first step an intermediate silicone copolycarbonate possessing either a blocky or random structure and reactive endgroups, and then appending additional structural in a second step which is complimentary to the first step and produces a product silicone copolycarbonate having both random and blocky substructures. The repeat units I and II appended in the second step may be the same or different as those repeat units I and II incorporated in the first step.

19 Claims, No Drawings

METHOD OF MAKING SILICONE COPOLYCARBONATES HAVING RANDOM AND BLOCKY SUBSTRUCTURES

RELATED APPLICATION

This application is a continuation-in-part of U.S. application Ser. No. 09/613,040, filed Jul. 10, 2000, now U.S. Pat. No. 6,492,481 which is incorporated herein by reference.

FIELD OF THE INVENTION

This invention relates to silicone copolycarbonates suitable for use in molded articles such as optical articles, methods for making such silicone copolycarbonates and methods for controlling the physical properties of silicone copolycarbonates. Material properties of silicone copolycarbonates are found to be controlled both by composition and method of preparation. Control of product properties by method of preparation is provided by three methods which provide identically constituted materials having different physical properties. This invention further relates to optical articles, and methods for making optical articles from the silicone copolycarbonates.

BACKGROUND OF THE INVENTION

The past two decades have seen tremendous growth in the use of optical plastics in information storage and retrieval technology. Polycarbonates and other polymer materials are utilized widely in optical data storage media, such as compact disks. In optical data storage applications, it is desirable that the plastic material chosen have excellent performance characteristics such as high transparency, low water affinity, good molding characteristics, substantial heat resistance and low birefringence. Low water affinity is particularly desirable in optical data storage media applications in which disk flatness is affected by water absorption. In "read through" applications successful employment of a particular optical plastic requires that it be readily molded into disks embossed with a series of very fine grooves and pits which govern critical aspects of data storage and retrieval. Replication of these grooves and pits during molding must occur with high precision and a high level of disk to disk uniformity must be achieved. Moreover the material itself must not stick to or foul the mold surfaces. Water affinity, molding characteristics, thermal and optical properties are properties of the material itself and will ultimately depend upon the structure of the optical polymer. Efforts to maximize desirable properties and repress undesirable properties in optical polymers have been intense. The chief means of discovery in this area has been through chemical synthesis and testing of new materials. Many different polymer types and structures have been prepared and evaluated. However, because each new application may require a different balance of material characteristics not currently provided by known materials, efforts directed to the discovery of new polymers has continued.

Silicone copolycarbonates, while as a class exhibiting poor miscibility of the silicone and polycarbonate repeat units and a marked tendency toward segregation into predominantly silicone-containing and polycarbonate-containing phases, are prized for their low temperature ductility and moldability. It has been discovered that the physical properties of silicone copolycarbonates may be controlled by controlling the molecular architecture of said silicone copolycarbonates. This control of the physical properties by controlling molecular architecture supplements the control over physical properties which may be exercised by changing the composition of the silicone copolycarbonate.

SUMMARY OF THE INVENTION

The present invention relates to a method of preparing a silicone copolycarbonate having a molecular architecture which comprises a combination of random and blocky substructures. More particularly the method of the present invention relates to a method of preparing silicone copolycarbonates, said silicone copolycarbonates comprising both random and blocky substructures, said method comprising:

Step (A) preparing in a first step an intermediate silicone copolycarbonate, said intermediate silicone copolycarbonate having a random or a blocky structure; and Step (B) reacting said intermediate silicone copolycarbonate in a second step which compliments the first step in that whichever structure, random or blocky, the silicone copolycarbonate intermediate has, a product formed in the second step will have both a random substructure and a blocky substructure.

This invention further relates to methods of controlling the physical properties of silicone copolycarbonate products made by the method of the present invention by controlling the relative amounts of random and blocky substructures present in said products. Thus, the physical properties of identically constituted silicone copolycarbonates may be controlled by choice of preparation method. Silicone copolycarbonates may be prepared by one of several methods which in turn provide products having varying amounts of random and blocky substructures. In "Method 1" interfacial polymerization of the starting monomers with phosgene affords a product having an entirely blocky structure and higher glass transition temperature than an identically constituted product produced by "Method 2" which produces a product silicone copolycarbonate having an entirely random structure. In Method 2, reaction of an oligomeric, non-silicone-containing bischloroformate with a silicone-containing bisphenol affords a product with a random structure and glass transition temperature lower than an identically constituted product produced by Method 1. Silicone copolycarbonates produced by Method 1 and Method 2 have molecular architectures which are entirely blocky or entirely random. Silicone copolycarbonates produced by Method 1 and Method 2 are considered to possess but a single substructure which is which is either random or blocky. One aspect of the present invention relates to the discovery of a third method, "Method 3", of preparing silicone-containing copolycarbonates which affords a product silicone copolycarbonate possessing a molecular architecture comprising both random and blocky substructures. Method 3, as disclosed herein, is a hybrid of methods 1 and 2 and is referred to as a hybrid method. Moreover, the molecular architecture comprising both random and blocky substructures provided by the application of Method 3 is referred to as "hybrid" molecular architecture. Still further, this invention relates to optical articles and other molded articles made from the silicone copolycarbonates prepared according to the method of the invention.

DETAILED DESCRIPTION OF THE INVENTION

The present invention may be understood more readily by reference to the following description of preferred embodiments of the invention and the Examples included herein.

It is to be understood that this invention is not limited to specific synthetic methods or to particular compositions falling within the class of silicone copolycarbonates. In this specification and in the claims which follow, reference will be made to a number of terms which shall be defined to have the following meanings.

The singular forms "a," "an" and "the" include plural referents unless the context clearly dictates otherwise.

"Optional" or "optionally" means that the subsequently described event or circumstance may or may not occur, and that description includes instances where the event or circumstance occurs and instances where it does not.

"BPA" is herein defined as bisphenol A or 2,2-bis(4-hydroxy-phenyl)propane.

"BCC" is herein defined as 1,1-bis(4-hydroxy-3-methylphenyl) cyclohexane.

"BPI" is herein defined as 1,1-bis-(4-hydroxyphenyl)-3,3,5-trimethylcyclohexane.

"BPZ" is herein defined as 1,1-bis-(4-hydroxyphenyl) cyclohexane.

"$C_p$" represents the heat capacity of a material.

"Degree of oligomerization" as used herein refers to the value of r in structural formula IV.

"Identically constituted" as used herein refers to silicone copolycarbonates which have roughly the same molecular weight and which contain the same relative number of moles of repeat units I and II, said relative number of moles of repeat units I and II being determined by nuclear magnetic resonance spectroscopy (NMR). Two silicone copolycarbonates are defined herein as having roughly the same molecular weight when each exhibits an $M_w$ value which is within 10% of the $M_w$ value measured for the other composition by gel permeation chromatography (gpc) using polystyrene standards.

"MTBAC" is herein defined as methyltributyl ammonium chloride.

"Optical data storage media" or an "optical data storage medium" refers to an article which may be encoded with data and which is read by optical means.

"Optical articles" as used herein include optical disks and optical data storage media, for example a rewritable or read only compact disk (CD), a digital versatile disk, also known as DVD, random access memory disks (RAM), magneto optical (MO) disks and the like; optical lenses, such as contact lenses, lenses for glasses, lenses for telescopes, and prisms; optical fibers; information recording media; information transferring media; high density data storage media, disks for video cameras, disks for still cameras and the like; as well as the substrate onto which optical recording material is applied. In addition to use as a material to prepare optical articles, the silicone copolycarbonate may be used as a raw material for films or sheets.

"Optical polymer" refers to a polymeric material having physical characteristics compatible with use in optical data storage devices wherein light is passed through the polymeric material as part of a data reading or writing operation such as in read through optical data storage devices. The term "optical polymer" is used interchangeably with the term "optical plastic".

As used herein, the term "silicone copolycarbonate" refers to a copolycarbonate comprising structural units derived from at least one silicone-containing bisphenol and at least one dihydroxy aromatic compound. A copolycarbonate comprising structural units I and II exemplifies silicone copolycarbonates.

"Styrenyl" is defined as a 2-phenyleth-1-yl or a 1-phenyleth-1-yl group.

"Trifluoropropyl" is defined as the 3,3,3-trifluoroprop-1-yl group.

Unless otherwise stated, "mole percent" in reference to the composition of a silicone copolycarbonate or polycarbonate in this specification is based upon 100 mole percent of the repeating units of the silicone copolycarbonate or polycarbonate. For instance, "a silicone copolycarbonate comprising 90 mole percent of BPA" refers to a silicone copolycarbonate in which 90 mole percent of the repeating units are residues derived from BPA or its corresponding derivative(s). Corresponding derivatives include but are not limited to, the polycarbonate oligomers of BPA terminated by chloroformate groups, referred to here as "oligomeric bischloroformate" and "oligomeric bischloroformates".

The terms "mole percent", "mole %" and "mol %" are used interchangeably throughout this application and have the meaning given above for "mole percent".

"Wt % Si" (Weight percent siloxane) denotes the weight of [$R^8R^9$ SiO] units in a given silicone copolycarbonate polymer relative to the total weight of the silicone copolycarbonate polymer. It is obtained by multiplying the weight in grams of the silicone-containing bisphenol used times the weight fraction of [$R^8R^9$ SiO] units in the bisphenol and dividing the product by the total weight in grams of all of the bisphenol monomers used in the preparation of the silicone copolycarbonate.

The terms "residues" and "structural units", used in reference to the constituents of the silicone copolycarbonate, are synonymous throughout the specification.

The present invention provides a method for the preparation of silicone copolycarbonates having molecular architectures comprising a combination of random and blocky substructures. In one embodiment the silicone copolycarbonates prepared by the method of the present invention comprise structural units I

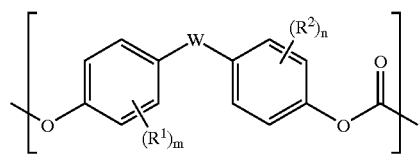

I wherein $R^1$ and $R^2$ are each independently at each occurrence halogen, $C_1$–$C_6$ alkyl or aryl;

m and n are each independently integers from 0–4;

W is a linking moiety selected from the group consisting of a bond, a $C_2$–$C_{18}$ alkylidene group, a $C_3$–$C_{12}$ cycloalkylidene group, a carbon atom optionally substituted by one or two hydrogen atoms or one or two $C_6$–$C_{10}$ aryl groups or one or two $C_1$–$C_{18}$ alkyl groups, an oxygen atom, a sulfur atom, a sulfonyl ($SO_2$) group and a carbonyl (CO) group;

and structural units II

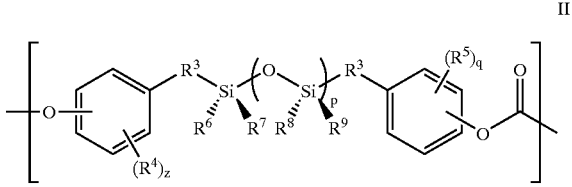

II wherein $R^3$ is a $C_2$–$C_{10}$ alkylene group optionally substituted by one or more $C_1$–$C_{10}$ alkyl or one or more aryl groups, an oxygen atom or an oxyalkyleneoxy moiety

—O—(CH$_2$)$_t$—O— or an oxyalkylene moiety

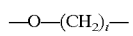
—O—(CH$_2$)$_t$— wherein t is an integer from 2–20;

$R^4$ and $R^5$ are each independently at each occurrence $C_1$–$C_6$ alkoxy, $C_1$–$C_6$ alkyl or aryl;

z and q are independently integers from 0–4;

$R^6$, $R^7$, $R^8$ and $R^9$ are each independently at each occurrence $C_1$–$C_6$ alkyl, aryl, $C_2$–$C_6$ alkenyl, cyano, trifluoropropyl or styrenyl; and p is an integer from about 5 to about 30.

Silicone copolycarbonates comprising repeat units I and II are prepared according to the method of the present invention from bisphenol starting materials having structure III

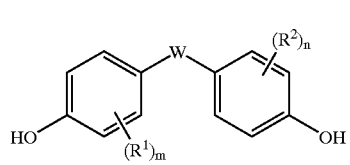

III wherein $R^1$, $R^2$, m, n, W are defined as in structure I, and silicone-containing bisphenols having structure V

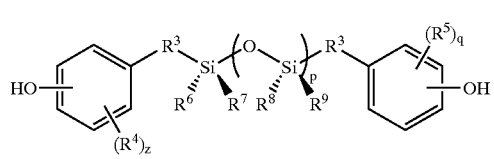

V wherein $R^3$, $R^4$, $R^5$ z, q, $R^6$, $R^7$, $R^8$, $R^9$ and p are defined as in structure II.

In one of its embodiments the present invention provides a silicone copolycarbonate exhibiting a Tg which is not only dependent upon composition, the relative amounts and structures of repeat units I and II present, but is also dependent upon the method of polymer preparation employed which in turn determines the molecular architecture ("blocky", "random" or a mixture of "blocky" and random") of the product silicone copolycarbonate.

In embodiments of the present invention in which the product silicone copolycarbonate comprises both random and blocky substructures comprising repeat units I and II, it has been found that the value of "p" in repeat unit II should be in a range between about 5 and about 30, preferably between about 5 and about 20. Otherwise, a silicone copolycarbonate is obtained, the properties of which are independent of the relative amounts of blocky and random substructures present.

In a further embodiment, the present invention provides a silicone copolycarbonate composition having increased utility in the preparation of molded optical articles relative to known silicone copolycarbonates in which the silicone and polycarbonate components phase segregate and the material behaves like an immiscible blend of a silicone polymer and a polycarbonate wherein the Tg of the polycarbonate phase is largely unaffected by the presence of, or amount of, the silicone-containing phase. Thus, unlike known phase segregated silicone copolycarbonates, the compositions prepared according to the method of the present invention are susceptible to the adjustment of glass transition temperature, and those processing characteristics dependent upon glass transition temperature, by varying the amount of the silicone comonomer employed in their preparation.

The present invention provides an additional tool which augments compositional control of physical properties of silicone copolycarbonates. Thus, it has been discovered that the physical properties of certain silicone copolycarbonates, those comprising repeat units II wherein p has a value in a range between about 5 and about 30, are dependent not only upon the structure and amount of the monomers employed but also upon the method of polymer synthesis employed. It has been discovered, for example, that the glass transition temperature and other physical properties of two silicone copolycarbonates prepared using identical amounts of a bisphenol III and a siloxane-containing bisphenol V may vary depending on whether the silicone copolycarbonate was prepared by reaction of the mixture under interfacial conditions of these two monomers with phosgene directly (Method 1), by reaction of the siloxane-containing bisphenol with an oligomeric bischloroformate IV

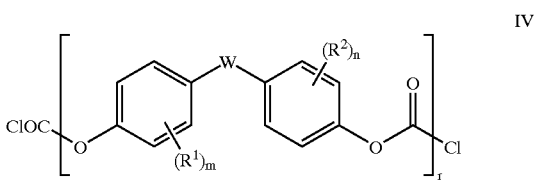

IV wherein $R^1$ and $R^2$ are each independently at each occurrence halogen, $C_1$–$C_6$ alkyl or aryl;

m and n are each independently integers from 0–4;

W is a linking moiety selected from the group consisting of a bond, a $C_2$–$C_{18}$ alkylidene group, a $C_3$–$C_{12}$ cycloalkylidene group, a carbon atom optionally substituted by one or two hydrogen atoms or one or two $C_6$–$C_{10}$ aryl groups or one or two $C_1$–$C_{18}$ alkyl groups, an oxygen atom, a sulfur atom, a sulfonyl ($SO_2$) group and a carbonyl (CO) group;

and r is an integer from 1–15;

(itself prepared from bisphenol III) under interfacial conditions (Method 2), or by a "hybrid" method incorporating elements of both Method 1 and Method 2 (Method 3).

METHOD 1

Preparation of Blocky Silicone Copolycarbonates

In some instances it has been found that when a mixture comprising the bisphenol monomers III and V is combined with a solvent and reacted with phosgene in the presence of water, an acid acceptor and optionally a phase transfer catalyst (i.e. under interfacial conditions), the rates of reaction of the bisphenol monomers III and V with phosgene or a chloroformate end group on a growing polymer chain are different enough to give compositions which are blocky. The degree to which a polymer has a blocky, or in the alternative, a random structure may be determined by $^1$H- or $^{13}$C-NMR. For the purposes of the present invention a blocky silicone copolycarbonate is defined as one in which the average block length of repeat unit II is greater than about 2. Bisphenols bearing substituents ortho to the OH group, such as eugenol siloxane bisphenol, are typically less reactive than unsubstituted bisphenols such as BPA. Phosgenation of a mixture of BPA and eugenol siloxane bisphenol wherein "p" has a value between about 5 and about 30 and gives a blocky, silicone copolycarbonate product.

The silicone copolycarbonates which are entirely blocky (i.e. silicone copolycarbonates possessing but a single substructure which is blocky) comprising repeat units having structure I and repeat units having structure II are prepared by reaction under interfacial conditions of a mixture of bisphenols III and V and, optionally, from about 0 to about 7 mole percent monofunctional phenol VI, based on total moles of III and V, with phosgene in the presence of an organic solvent, water, an acid acceptor and optionally a phase transfer catalyst. Thus, a mixture of bisphenols III and V together with monofunctional phenol VI

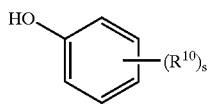

VI wherein $R^{10}$ is a $C_1$–$C_{20}$ alkyl group optionally substituted by one or more $C_6$–$C_{10}$ aryl groups; a $C_1$–$C_{20}$ alkoxy group optionally substituted by one or more $C_6$–$C_{10}$ aryl groups, and s is an integer from 0–5, is combined with an organic solvent and water and optionally a phase transfer catalyst. Sufficient aqueous alkali metal hydroxide or alkaline earth metal hydroxide is added to bring the pH of the reaction mixture to a pH value in the range between about 9 and about 12 with a pH of about 10.5 being preferred. Phosgene is then introduced into the reaction mixture together with sufficient hydroxide to maintain a pH of about 10.5. When the desired amount of phosgene has been introduced, usually an amount in the range of between about 100 mole % and about 200 mole % based on total moles of bisphenols III and V employed, the reactor is purged of any excess phosgene and the product silicone copolycarbonate having a blocky structure is isolated.

Monophenols VI are typically added as a means of controlling the molecular weight of the siloxane copolycarbonate and the identity of the polymer end groups. Typically the amount of monofunctional phenol VI employed is in a range from about 0 mole percent to about 7 mole percent based on the total moles of repeat units I and II. Suitable monophenols are exemplified by, but not limited to, the following: phenol; 4-t-butylphenol; 4-cumylphenol; 3,5-dimethylphenol and 2,4-dimethylphenol.

Suitable organic solvents which can be used under interfacial reaction conditions generally are, for example, chlorinated aliphatic hydrocarbons, such as methylene chloride, carbon tetrachloride, dichloroethane, trichloroethane and tetrachloroethane; substituted aromatic hydrocarbons such as chlorobenzene, o-dichlorobenzene, and the various chlorotoluenes. The chlorinated aliphatic hydrocarbons, especially methylene chloride, are preferred.

Alkali metal or alkaline earth metal hydroxides which can be employed as acid acceptors under interfacial reaction conditions are, for example, sodium hydroxide, potassium hydroxide, and calcium hydroxide. Sodium and potassium hydroxides, and particularly sodium hydroxide are preferred.

Suitable phase transfer catalysts (PTC) for use according to the method of the present invention are illustrated by but are not limited to the following low molecular weight amines such as triethylamine ($Et_3N$), ammonium salts such as $[CH_3(CH_2)_3]_4NZ$, $[CH_3(CH_2)_3]_4PZ$, $[CH_3(CH_2)_5]_4NZ$, $[CH_3(CH_2)_6]_4NZ$, $[CH_3(CH_2)_4]_4NZ$ $CH_3[CH_3(CH_2)_2]_3NZ$, and $CH_3[CH_3(CH_2)_3]_3NZ$, where Z is selected from Cl or Br, and phosphonium salts such as tetrabutylphosphonium chloride and the like.

METHOD 2

Preparation of Random Silicone Copolycarbonates

Alternatively, bisphenol component III is first oligomerized at relatively low pH in the presence of excess phosgene to a give an oligomeric bischloroformate IV wherein r has a value in a range between about 1 and about 15, preferably between about 5 and about 10. The bischloroformate IV is then reacted under interfacial conditions at a pH of from about 9 to about 12 with the silicone-containing bisphenol V and, optionally, a monofunctional phenol VI in a solvent in the presence of water, an acid acceptor and optionally a phase transfer catalyst to give a silicone copolycarbonate product having an entirely random structure. A silicone copolycarbonate having a random structure is defined herein as one in which the average block length of repeat unit II is about 1. In order to achieve incorporation of all of the components and an average block length of repeat unit II of about 1 there must be a preponderance of chloroformate groups of bischlororformate oligomer IV relative to the number of OH groups of silicone-containing bisphenol V and monofunctional phenol VI. In some instances, as when a very small amount of the silicone-containing bisphenol V is employed, for example less than 1 mole percent relative to the number of moles of repeat units I present in the oligomeric bischloroformate IV, the number of chloroformate end groups remaining after the reaction of bischloroformate IV with bisphenol V and monofunctional phenol VI may be substantial and the molecular weight of the product insufficient to afford the properties desired. Residual chloroformate end groups may be hydrolyzed by base under the interfacial reaction conditions employed to afford phenolic end groups which react further with remaining chloroformate end groups to build molecular weight of the product silicone copolycarbonate. For these reasons the average block length of repeat unit I in silicone copolycarbonates having a random structure prepared by reaction of an oligomeric bischloroformate IV with a silicone-containing bisphenol V and a monofunctional phenol VI is always at least the value of r.

Solvents, alkali metal hydroxides and phase transfer catalysts which are suitable for use under interfacial reaction conditions described in Method 1 are equally useful under the protocol of Method 2.

After reaction between the silicone-containing bisphenol V, monofunctional phenol VI and the oligomeric bischloroformate IV is complete, the reaction mixture may be checked for the presence of unreacted chloroformate end groups. Unreacted chloroformate endgroups may be eliminated by the introduction of a small amount of a tertiary amine, such as triethylamine, or additional bisphenol III or V or additional monofunctional phenol VI.

METHOD 3

Preparation of "Hybrid" Silicone Copolycarbonates

As mentioned, the protocols of Method 1 and Method 2 provide respectively entirely blocky or entirely random silicone copolycarbonates. It has been discovered that by incorporating elements of each of Method 1 and Method 2 into a common protocol, Method 3, product silicone copolycarbonates may be obtained which possess both blocky and random substructures. The terms "blocky" and "random" as applied to substructures present in silicone copolycarbonates have the same meaning and are defined the same way as when the terms are applied to entirely blocky or entirely random silicone copolycarbonates. What is meant by a silicone copolycarbonate having random substructures and blocky substructures is that the silicone copolycarbonate comprises repeat units I and II organized in a blocky fashion in at least one part of the silicone copolycarbonate (the blocky substructure) and further comprises repeat units I and II organized in a random fashion in at least one other part of the silicone copolycarbonate (the random substructure).

In its broadest sense, the method of the present invention embodied by Method 3 represents a protocol for preparing a silicone copolycarbonate comprising both random and blocky substructures. This is done by preparing in a first step, Step (A), an "intermediate silicone copolycarbonate"

having either a random or a blocky structure. This intermediate silicone copolycarbonate comprises structural units I and II and chain terminal groups capable of further reaction under interfacial polymerization conditions. Thus the chain terminal groups of the intermediate silicone copolycarbonate are typically chloroformate groups (ClOCO) or hydroxyl groups (OH) which are subject to further reaction under interfacial reaction conditions with additional reactants; phosgene, bisphenols III, silicone-containing bisphenols V, and oligomeric chloroformates IV, to form an ultimate product silicone copolycarbonate having a higher molecular weight than the intermediate silicone copolycarbonate. The conversion of the intermediate silicone copolycarbonate to a product silicone copolycarbonate is carried out in a second step, Step (B), in which the intermediate silicone copolycarbonate having either a random or a blocky structure is converted into a product silicone copolycarbonate comprising both random and blocky substructures. As the preceding discussion makes clear, the second step, step (B), is complimentary to the first step in that if the first step elaborates an intermediate silicone copolycarbonate having a blocky structure, then the second step is selected such that the product silicone copolycarbonate comprises both blocky and random substructures. In this example, because the intermediate silicone copolycarbonate formed in step (A) possesses a blocky structure, the protocol selected for step (B) must compliment step (A) and add via chain extension a substructure possessing a random structure. Typically, the step (B) will append to the intermediate silicone copolycarbonate but a single substructure comprising repeat units I and II, and these repeat units appended in step (B) will be organized in a substructure having a molecular architecture (blocky or random) which compliments the molecular architecture present in the intermediate silicone copolycarbonate. For the sake of clarity, it should be noted that what is referred to as a "structure" in the intermediate silicone copolycarbonate becomes a "substructure" in the product silicone copolycarbonate.

Solvents, alkali metal hydroxides and phase transfer catalysts which are suitable for use under interfacial reaction conditions described in Method 1 and Method 2 are equally useful under the protocol of Method 3.

In one embodiment of the present invention Step (A) comprises reacting with phosgene under interfacial conditions, at least one bisphenol having structure III and at least silicone-containing bisphenol V.

In an alternative embodiment step (A) comprises reacting under interfacial conditions a bischloroformate having structure IV with a silicone-containing bisphenol having structure V.

In one embodiment of the preparation step (B) comprises reacting with phosgene under interfacial conditions, the intermediate silicone copolycarbonate prepared in step (A) having a random structure, at least one bisphenol having structure III, and at least silicone-containing bisphenol V.

In an alternate embodiment step (B) comprises reacting under interfacial conditions the intermediate silicone copolycarbonate formed in step (A) having a blocky structure with at least one bischloroformate having structure IV and a silicone-containing bisphenol having structure V.

In general, the product silicone copolycarbonate formed by the application of the method of the present invention comprises random and blocky substructures in amounts such that the amount of the random substructure corresponds to between about 0.001 and about 1000 times the amount of blocky substructure. Typically the product silicone copolycarbonate comprises between about 1 and about 99 percent by weight random substructure and between about 99 to about 1 percent weight percent by weight blocky substructure. In a particular embodiment the product silicone copolycarbonate comprises between about 40 and about 60 percent by weight random substructure and between about 60 to about 40 percent weight percent by weight blocky substructure.

Typically, the silicone copolycarbonates prepared according to the method of the present invention comprise between about 0.1 and about 20 percent, preferably between about 1 and about 10 percent by weight percent siloxane based upon the total weight of the product silicone copolycarbonate.

In one embodiment of the present invention provides a method of preparing a silicone copolycarbonate comprising both random and blocky substructures, said method comprising:

Step (A) preparing in a first step an intermediate silicone copolycarbonate by reacting under interfacial conditions an oligomeric bisphenol A bischloroformate having a degree of oligomerization of between about 1 and about 15 with eugenol siloxane bisphenol having between about 5 and about 30 Me$_2$SiO units, said intermediate silicone copolycarbonate having a random structure, and Step (B) reacting said intermediate silicone copolycarbonate in a second step to form a silicone copolycarbonate product, said second step being one which compliments the first step, said second step providing a silicone copolycarbonate which has both a random substructure and a blocky substructure.

In one embodiment of the present invention step (B) comprises reacting under interfacial conditions the intermediate silicone copolycarbonate having a random structure with phosgene, bisphenol A and eugenol siloxane, said eugenol siloxane comprising between about 5 and about 30 Me$_2$SiO units.

In preferred embodiments of the present invention repeat units having structure I are best represented by structure VII and silicone-containing

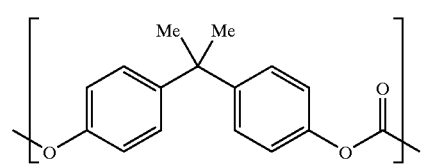

repeat units II are best represented by structure VIII.

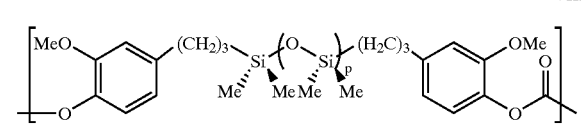

Representative examples of siloxane-containing bisphenols V include, but are not limited to eugenol siloxane bisphenol and other siloxane containing bisphenols shown below in which p is an integer from about 5 to about 30.

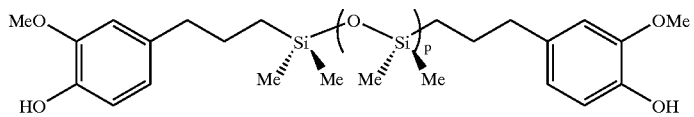

eugenol siloxane bisphenol

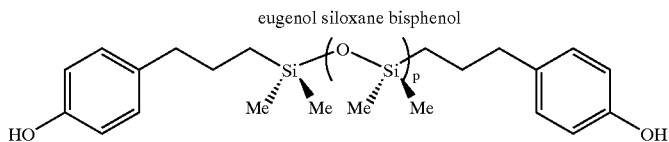

4-allylphenol siloxane bisphenol

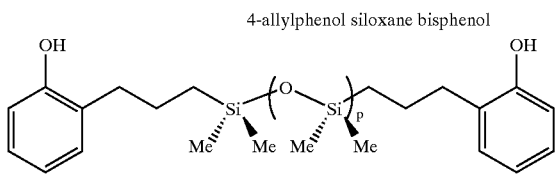

2-allylphenol siloxane bisphenol

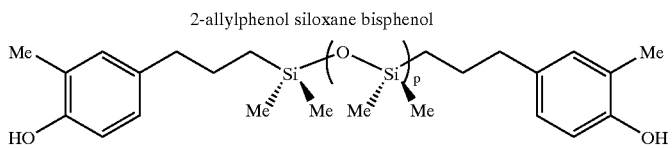

4- ally-2-methyllphenol siloxane bisphenol

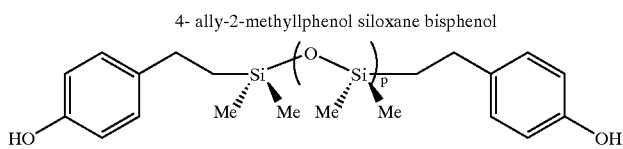

4-vinylphenol siloxane bisphenol

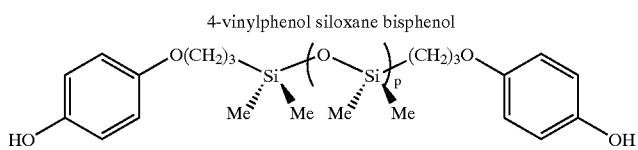

4-allyoxyphenol siloxane bisphenol

Typically, the silicone copolycarbonates of the present invention may comprise repeat units I in a range between about 80 mole % and about 99.999 mole % and repeat units II in a range between about 0.001 mole % and about 20 mole %. Generally, it is preferred that the silicone copolycarbonates of the present invention comprise repeat units I in a range between about 90 mole % and about 99.9 mole % and repeat units II in a range between about 10 mole % and about 0.1 mole %.

The silicone copolycarbonates of the present invention may optionally be blended with other polymers such as polycarbonates, copolycarbonates, copolyestercarbonates and polyesters which are illustrated by but not limited to the following: bisphenol A polycarbonate, BCC polycarbonate, BPZ polycarbonate, copolycarbonates of BPA and BPI, BPA-dodecanedioic acid copolyestercarbonate, polyethylene terephthalate, and the like.

The silicone copolycarbonates of the present invention may optionally be blended with any conventional additives used in various applications such as the preparation of optical articles. Said conventional additives include but are not limited to UV absorbers, antioxidants, heat stabilizers, anti static agents and mold release agents, slip agents, antiblocking agents, lubricants, anticlouding agents, coloring agents, natural oils, synthetic oils, waxes, organic fillers and mixtures thereof.

In particular, it is preferable to form a blend of the silicone copolycarbonate and additives which aid in processing the blend to form the desired molded article such as an optical article. The blend may optionally comprise from about 0.0001 to about 10% by weight of the desired additives, more preferably from about 0.0001 to about 1.0% by weight of the desired additives.

Examples of the aforementioned heat stabilizers, include, but are not limited to, phenol stabilizers, organic thioether stabilizers, organic phosphite stabilizers, hindered amine stabilizers, epoxy stabilizers and mixtures thereof. The heat stabilizer may be added in the form of a solid or liquid.

Examples of UV absorbers include, but are not limited to, salicylic acid UV absorbers, benzophenone UV absorbers, benzotriazole UV absorbers, cyanoacrylate UV absorbers and mixtures thereof.

Examples of the mold release agents include, but are not limited to natural and synthetic paraffins, polyethylene waxes, fluorocarbons, and other hydrocarbon mold release agents; stearic acid, hydroxystearic acid, and other higher fatty acids, hydroxy fatty acids, and other fatty acid mold release agents; stearic acid amide, ethylenebisstearamide, and other fatty acid amides, alkylenebisfatty acid amides, and other fatty acid amide mold release agents; stearyl alcohol, cetyl alcohol, and other aliphatic alcohols, polyhydric alcohols, polyglycols, polyglycerols and other alcoholic mold release agents; butyl stearate, pentaerythritol tetrastearate, and other lower alcohol esters of fatty acids, polyhydric alcohol esters of fatty acids, polyglycol esters of fatty acids, and other fatty acid ester mold release agents; silicone oil and other silicone mold release agents, and mixtures of any of the aforementioned.

The coloring agent may be either pigments or dyes. Organic coloring agents may be used separately or in combination in the invention.

A desired article comprising the silicone copolycarbonate prepared by the method of the present invention may be obtained by molding the silicone copolycarbonate or alternatively molding a blend of the silicone copolycarbonate with a polycarbonate, a copolycarbonate, a copolyestercarbonate or a polyester by injection molding, compression molding, extrusion methods and solution casting methods. Injection molding is the more preferred method of forming the article.

In some instances it is advantageous to modify the processability or other physical characteristics such as glass transition temperature, toughness or ductility of a silicone copolycarbonate material by means other than adjusting the relative amounts of repeat units I and II. The instant invention demonstrates that the structure of a silicone copolycarbonate as well as it's composition impacts important physical characteristics such properties as Tg, ease of molding and robustness of molded articles.

EXAMPLES

The following examples are put forth so as to provide those of ordinary skill in the art with a detailed disclosure and description of how the illustrative compositions of matter and methods claimed herein are made and evaluated, and are not intended to limit the scope of what the inventors regard as their invention. Unless indicated otherwise, parts are by weight, temperature is in ° C. and pressure is at or near atmospheric. The materials and testing procedures used for the results shown herein are as follows. Molecular weights are reported as weight average ($M_w$) in units of g/mol. Molecular weights were determined by gel permeation chromatography (gpc) using an HP1090 HPLC with two Polymer Labs Mixed Bed C columns at 35° C., a flow rate of 1 milliliter per minute (mL/min), chloroform as solvent and a calibration based on polystyrene standards. $T_g$ values were determined by differential scanning calorimetry using a Perkin Elmer DSC7. The Tg was calculated based on the ½ Cp method using a heating ramp of 20° C./min.

Example 1

BPA-Eugenol Siloxane Bisphenol (p=9) Copolycarbonate ("Random" Architecture)

A 500 mL Morton flask was charged with BPA (22.8 g, 100 mmol), p-cumylphenol (1.06 g, 5.0 mmol), methylene chloride (125 mL), distilled water (90 mL) and MTBAC (0.5 g of a 75 wt % solution in water). The pH was adjusted to about 10.5 with a solution of 50 percent by weight NaOH in water. Phosgene (7.8 g, 78 mmol) was added at 0.6 g/min maintaining the pH at about 10.5 by the addition of a solution of 50 percent by weight NaOH in water. The pH was allowed to drop to about 8.0 and additional phosgene (3.3 g) was added at 0.6 g/min while maintaining the pH at about 8.0. Eugenol siloxane bisphenol (p=9) (3.2 g, 3 mmol) was added and pH was raised to between about 9 and about 10. The reaction was stirred for 10 min. Triethylamine (125 microliters) was added and the reaction was stirred until no chloroformates were detected. Methylene chloride (25 mL) was added and the polymer solution was separated from the brine and washed once with 1N HCl and four times with distilled water. The polymer solution was precipitated into boiling water (750 mL) at high shear in a blender, washed with water (500 mL) and dried overnight at 110° C. under vacuum. The polymer, analyzed by $^1$H-NMR, showed complete incorporation of the eugenol siloxane bisphenol, had a Tg 122° C. and a weight average molecular weight ($M_w$) of 39,900. A film cast from this material was transparent. The product copolycarbonate was shown by $^1$H-NMR to have a random structure.

Example 2

BPA-Eugenol Siloxane Bisphenol (p=9) Copolycarbonate ("Blocky" Architecture)

A 500 mL Morton flask was charged with BPA (22.8 g, 100 mmol), p-cumylphenol (1.06 g, 5.0 mmol), methylene chloride (125 mL), distilled water (90 mL), triethylamine (125 microliters) and eugenol siloxane bisphenol (3.2 g, 3 mmol) having a value of "p" of about 9. The pH was adjusted to about 10.5 with a solution of 50 percent by weight NaOH in water. Phosgene (13.2 g, 132 mmol) was added at 0.6 g/min while maintaining the pH at about 10.5 by the addition of a solution of 50 percent by weight NaOH in water. Methylene chloride (25 mL) was added and the organic phase was separated from the brine and washed once with 1 N HCl and four times with distilled water. The product polymer was isolated by the addition of the washed methylene chloride solution to boiling water (750 mL) at high shear. The flocculant powder was filtered, washed with distilled water (500 mL) and dried for 24 hr under vacuum at 110° C. The product silicone copolycarbonate had a Tg of 134° C. and a weight average molecular weight ($M_w$) of 40,700 as determined by gel permeation chromatography (gpc). $^1$H-NMR in $CDCL_3$ solution revealed the complete incorporation of the eugenol siloxane bisphenol. The product copolycarbonate was further shown by $^1$H-NMR to have a blocky structure.

Example 3

BPA-Eugenol Siloxane Bisphenol(p=9) Copolycarbonate ("Hybrid" Method)

A 500 mL Morton flask was charged with BPA (11.4 g, 50 mmol), methylene chloride (125 mL), distilled water (90 mL) and MTBAC (0.5 g of a 75 wt % solution in water). The pH was adjusted to 7 with 25 wt % NaOH. Phosgene (7.63 g, 76 mmol, 50 mol % excess) was added at 0.5 g/min maintaining the pH at 7 by the addition of the NaOH solution. The pH was raised to 11.5–12 and eugenol siloxane bisphenol (p=9) (1.6 g, 1.5 mmol) was added and the reaction was stirred for 10 min. BPA (11.4 g, 50 mmol) and p-cumylphenol (1.06 g, 5.0 mmol, 5.0 mol %) were added and the reaction stirred until chloroformates were no longer detected. Triethylamine (200 uL) was added along with eugenol siloxane bisphenol (p=9) (1.6 g, 1.5 mmol) followed by phosgene (6.11 g, 61 mmol) at pH 10.5. The polymer solution was separated from the brine and washed one time with 1N HCl and two times with distilled water. The polymer solution was precipitated into boiling water (750 mL) in a blender, washed with water (500 mL) and dried overnight at 110° C. under vacuum. The polymer, analyzed by $^1$H-NMR, showed complete incorporation of the eugenol siloxane bisphenol (8.9 wt %). The Tg was 128° C. and the weight average molecular weight, $M_w$, was 36,500. The product copolycarbonate was shown by $^1$H-NMR to have both blocky and random substructures, the relative amounts of the blocky and random substructures being about 50 percent.

Example 4

BPA-Eugenol Siloxane Bisphenol (p=19) Colpolycarbonate ("Random" Architecture)

A 500 mL Morton flask was charged with BPA (22.8 g, 100 mmol), p-cumylphenol (1.06 g, 5.0 mmol, 5.0 mol %), methylene chloride (125 mL), distilled water (90 mL) and MTBAC (0.5 g of a 75 wt % solution in water). The pH was adjusted to 10.5 with 50 wt % NaOH. Phosgene (7.8 g, 78 mmol, 78 mol % equivalence) was added at 0.6 g/min maintaining the pH at 10.5 by the addition of the NaOH solution. The pH was lowered to 8.0 and phosgene (2.8 g, 10.6 g total, 5 mol % excess) was added at 0.6 g/min. Eugenol siloxane bisphenol (p=19) (3.2 g, 1.8 mmol) was added and the pH was raised to 10. The reaction was stirred for 10 min. Triethylamine (125 uL, 1 mol %) was added and reaction stirred until no chloroformates remained. Phosgene (0.35 g) was added to adjust the pH to 9.0. The polymer solution was separated from the brine and washed one time with 1N HCl and two times with distilled water. The polymer solution was precipitated into boiling water (750 mL) in a blender, washed with water (500 mL) and dried overnight at 110° C. under vacuum. The polymer was analyzed by $^1$H-NMR and showed complete incorporation of the eugenol siloxane bisphenol to give a BPA-eugenol siloxane bisphenol copolycarbonate comprising 10.0% by weight repeat units derived from the eugenol siloxane bisphenol having a value of "p" of about 19. The Tg was 133° C. and the weight average molecular weight, $M_w$, was 41,000. The product copolycarbonate was shown by $^1$H-NMR to have a random structure.

Example 5

BPA-Eugenol Siloxane Bisphenol (p=19) Copolycarbonate ("Blocky" Architecture)

A 500 mL Morton flask was charged with BPA (22.8 g, 100 mmol), eugenol siloxane bisphenol (p=19) (3.2 g, 1.8 mmol), p-cumylphenol (0.85 g, 4.0 mmol, 4.0 mol %), methylene chloride (125 mL), distilled water (90 mL) and triethylamine (125 uL, 1 mol %). The pH was adjusted to 10.5 with 50 wt % NaOH. Phosgene (13.2 g, 132 mmol, 30 mol % excess) was added at 0.6 g/min maintaining the pH at 10.5 by the addition of the NaOH solution. Methylene chloride (25 mL) was added. The polymer solution was separated from the brine and washed once with 1N HCl and four times with distilled water. The polymer solution was precipitated into boiling water (750 mL) in a blender, washed with water (500 mL) and dried overnight at 110° C. under vacuum. The product polymer, analyzed by $^1$H-NMR, showed complete incorporation of the eugenol siloxane bisphenol (9.9 wt %). The product copolycarbonate had a Tg of 140° C. and a weight average molecular weight, Mw, of 57,600. The product copolycarbonate was shown by $^1$H-NMR to have a blocky structure.

Example 6

BPA-Eugenol Siloxane Bisphenol (p=19) Copolycarbonate ("Hybrid" Method)

A 500 mL Morton flask was charged with BPA (11.4 g, 50 mmol), methylene chloride (125 mL), distilled water (90 mL) and MTBAC (0.5 g of a 75 wt % solution in water). The pH was adjusted to 7 with 25 wt % NaOH. Phosgene (7.63 g, 76 mmol, 50 mol % excess) was added at 0.5 g/min maintaining the pH at 7 by the addition of the NaOH solution. The pH was raised to 11.5–12 and eugenol siloxane bisphenol (p=19) (1.6 g, 0.9 mmol) was added and the reaction was stirred for 10 min. BPA (11.4 g, 50 mmol) and p-cumylphenol (1.06 g, 5.0 mmol, 5.0 mol %) were then added and the reaction stirred until chloroformates were no longer detected. Triethylamine (200 uL) was added along with eugenol siloxane bisphenol (p=19) (1.6 g, 0.9 mmol) followed by phosgene (6.11 g, 61 mmol) at pH 10.5. The polymer solution was separated from the brine and washed once with 1N HCl and twice with distilled water. The polymer solution was precipitated into boiling water (750 mL) in a blender, washed with water (500 mL) and dried overnight at 110° C. under vacuum. The product copolycarbonate was analyzed by $^1$H-NMR and shown to have both blocky and random substructures, the relative amounts of the blocky and random substructures being about 50 percent. $^1$H-NMR established complete incorporation of the eugenol siloxane bisphenol (9.8 wt %). The Tg of the product copolycarbonate was 136° C. and the weight average molecular weight, $M_w$, was 35,900.

Data for Examples 1–6 are gathered in Table 1 below and demonstrate that the "hybrid" method of Examples 3 and 6 may be used to control the molecular architecture of the product silicone copolycarbonates and that control over molecular architecture provides a useful means of controlling polymer properties which are dependent upon molecular architecture, for example the glass transition temperature of the silicone copolycarbonate. Examples 1, 4, 2, and 5 are examples of silicone copolycarbonates having essentially completely random (Examples 1 and 4) or completely blocky (Examples 2 and 5) structures. The physical properties of silicone copolycarbonates possessing both random and blocky substructures (See Examples 3 and 6) are shown to depend upon the relative amounts of random and blocky substructures present. The physical properties of the silicone copolycarbonates of Examples 1, 4, 2, and 5 represent the outer limits of the physical properties which may be observed for an identically constituted silicone copolycarbonate possessing both random and blocky substructures. As the fraction of the random substructure increases and the fraction of blocky substructure decreases, the physical properties of a silicone copolycarbonate possessing both of said random and blocky substructures will tend to approach the physical properties of an identically constituted silicone copolycarbonate having a similar molecular weight and a random structure. Similarly, as the fraction of blocky substructure increases and the fraction of random substructure decreases, the physical properties of a silicone copolycarbonate possessing both of said blocky and random substructures will tend to approach the physical properties of an identically constituted silicone copolycarbonate having a similar molecular weight and a blocky structure. Thus, for a silicone copolycarbonate possessing both random and blocky substructures, a given physical property which is dependent upon the relative amounts of said random and blocky substructures present, for example glass transition temperature (Tg), may be varied to any Tg within a range bounded by the Tg of an identically constituted, completely random silicone copolycarbonate and the Tg of an identically constituted, completely blocky silicone copolycarbonate.

The silicone copolycarbonates of Examples 3 and 6 were shown by $^1$H-NMR to possess roughly equal amounts of random and blocky substructures and the Tgs of Examples 3 and 6 are weighted averages of the Tgs of the corresponding identically constituted, random (Example 1(p=9) and 4(p=19) respectively) and the corresponding identically constituted, blocky (Example 2 (p=9) and 5 (p=19)) silicone copolycarbonates. Thus, the data presented in Table 1 provides a striking illustration of the method of the present invention.

TABLE 1

PROPERTIES OF SILOXANE COPOLYCARBONATES HAVING "RANDOM", "BLOCKY", AND "HYBRID" MOLECULAR ARCHITECTURES

| Example | Molecular Architecture | "p" | Weight % "EuSi BP"[a] incorporated | Mole % "EuSi BP"[a] incorporated | $M_w$[b] | Tg |
|---|---|---|---|---|---|---|
| 1 | "random" | 9 | 8.8 | 2.9 | 39,900 | 122° C. |
| 2 | "blocky" | 9 | 8.8 | 2.9 | 40,700 | 134° C. |
| 3 | "hybrid" | 9 | 8.9 | 2.9 | 36,500 | 128° C. |
| 4 | "random" | 19 | 10.0 | 1.8 | 41,000 | 133° C. |
| 5 | "blocky" | 19 | 9.9 | 1.8 | 57,600 | 140° C. |
| 6 | "hybrid" | 19 | 9.8 | 1.8 | 35,900 | 136° C. |

[a]"EuSi BP" is eugenol siloxane bisphenol.
[b]$M_w$ is weight average molecular weight determined by gpc using polystyrene molecular weight standards As the following Prophetic Example illustrates, the repeat units I and II appended in the second step, step (B), of the method of the present invention may be the same or different as those repeat units I and II incorporated in the first step, step (A), of the method of the present invention.

Prophetic Example 1

BPA-2-Allyl Phenol Siloxane Bisphenol (p=9)-BPA-Eugenol Siloxane Bisphenol(p=9) Copolycarbonate ("Hybrid" Method)

A 500 mL Morton flask is charged with BPZ (14.1 g, 50 mmol), methylene chloride (125 mL), distilled water (90 mL) and MTBAC (0.5 g of a 75 wt % solution in water). The pH is adjusted to pH 7 with 25 wt % NaOH. Phosgene (7.63 g, 76 mmol, 50 mol % excess) is added at 0.5 g/min maintaining the pH at 7 by the addition of the NaOH solution. The pH is raised to between about pH 11.5 and about pH 12, and 2-allylphenol siloxane bisphenol (p=9) (1.5 g, 1.5 mmol) is added and the reaction is stirred for 10 min. BPA (11.4 g, 50 mmol) and p-cumylphenol (1.06 g, 5.0 mmol, 5.0 mol %) are added and the reaction is stirred until chloroformates are no longer detected. Triethylamine (200 uL) is added along with eugenol siloxane bisphenol (p=9) (1.6 g, 1.5 mmol) followed by phosgene (6.11 g, 61 mmol) at about pH 10.5. Upon completion of phosgene addition the reaction mixture is stirred for 10 minutes at ambient temperature. The polymer solution is then separated from the brine and washed one time with 1N HCl and two times with distilled water. The polymer solution is precipitated into boiling water (about 750 mL) in a blender, washed with water (about 500 mL) and dried overnight at 110° C. under vacuum. The polymer, when analyzed by $^1$H-NMR, shows complete incorporation of both the 2-allylphenol siloxane bisphenol and the eugenol siloxane bisphenol (about 9 wt %). The product copolycarbonate is shown by $^1$H-NMR to have both blocky and random substructures, the relative amounts of the blocky and random substructures being about 50 percent. The repeat units derived from the BPZ and the 2-allyl phenol siloxane bisphenol are shown by NMR to reside substantially within that portion of the product silicone copolycarbonate having a random substructure. The repeat units derived from the BPA and the eugenol siloxane bisphenol are shown by $^1$H- and $^{13}$C-NMR to reside substantially within that portion of the product silicone copolycarbonate having a blocky substructure.

The invention has been described in detail with particular reference to preferred embodiments thereof, but it will be understood by those skilled in the art that variations and modifications can be effected within the spirit and scope of the invention.

I claim:

1. A method of preparing silicone copolycarbonates, said silicone copolycarbonates comprising both random and blocky substructures, said method comprising:

Step (A) preparing in a first step an intermediate silicone copolycarbonate, said intermediate silicone copolycarbonate having a random or a blocky structure; and Step (B) reacting said intermediate silicone copolycarbonate in a second step which compliments the first step in that whichever structure, random or blocky, the silicone copolycarbonate intermediate has, a product silicone copolycarbonate formed in the second step will have both a random substructure and a blocky substructure;

wherein the blocky structure is made by interracial polymerization utilizing a bisphenol compound and the random structure is made by interfacial polymerization utilizing an oligomeric bischloroformate of a bisphenol compound.

2. A method according to claim 1 wherein Step (A) comprises reacting with phosgene under interfacial conditions at least one bisphenol having structure III

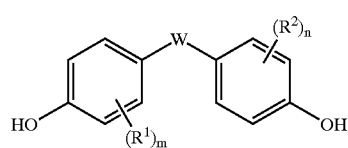

III wherein $R^1$ and $R^2$ are each independently at each occurrence halogen, $C_1$–$C_6$ alkyl or aryl, m and n are each independently integers from 0–4, W is a linking moiety selected from the group consisting of: a bond, a $C_2$–$C_{18}$ alkylidene group, a $C_3$–$C_{12}$ cycloalkylidene group, a carbon atom optionally substituted by one or two hydrogen atoms or one or two $C_6$–$C_{10}$ aryl groups or one or two $C_1$–$C_{18}$ alkyl groups; an oxygen atom, a sulfur atom, a sulfonyl ($SO_2$) group and a carbonyl (CO) group;

and at least silicone-containing bisphenol V

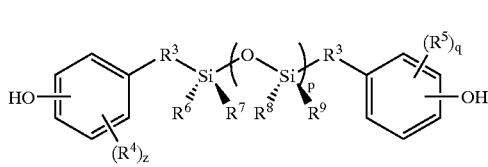

wherein $R^3$ is a $C_2$–$C_{10}$ alkylene group optionally substituted by one or more $C_1$–$C_{10}$ alkyl or one or more aryl groups, an oxygen atom or an oxyalkyleneoxy moiety

or an oxyalkylene moiety

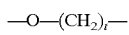

wherein t is an integer from 2–20;
R$^4$ and R$^5$ are each independently at each occurrence $C_1$–$C_6$ alkoxy, $C_1$–$C_6$ alkyl or aryl;
z and q are independently integers from 0–4;
R$^6$, R$^7$, R$^8$ and R$^9$ are each independently at each occurrence $C_1$–$C_6$ alkyl, aryl, $C_2$–$C_6$ alkenyl, cyano, trifluoropropyl or styrenyl; and
p is an integer from about 5 to about 30.

3. A method according to claim 2 wherein said bisphenol having structure III is selected from the group consisting of 2,2-bis(4-hydroxyphenyl)propane (BPA); 2,2-bis(4-hydroxyphenyl)butane; 2,2-bis(4-hydroxyphenyl)pentane; 2,2-bis(4-hydroxy-3-methylphenyl)propane; 2,2-bis(3-ethyl-4-hydroxyphenyl)propane; 1,1-bis(4-hydroxy-3-methylphenyl)cyclohexane; 1,1-bis(4-hydroxy-3-methylphenyl)cyclopentane; and 1,1-bis(4-hydroxy-3-methylphenyl)cycloheptane.

4. A method according to claim 2 wherein said silicone-containing bisphenol V is a siloxane-containing bisphenol comprising between about 5 and about 30 Me$_2$SiO units, said siloxane-containing bisphenol being selected from the group consisting of eugenol siloxane bisphenol; 4-allyl-2-methylphenol siloxane bisphenol; 4-allylphenol siloxane bisphenol; 2-allylphenol siloxane bisphenol; 4-allyloxyphenol siloxane bisphenol; and 4-vinylphenol siloxane bisphenol.

5. A method according to claim 1 wherein step (A) comprises reacting under interfacial conditions a bischloroformate having structure IV

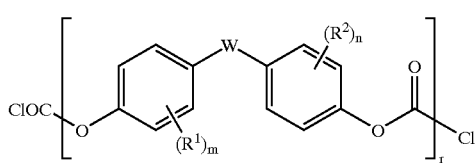

wherein $R^1$ and $R^2$ are each independently at each occurrence halogen, $C_1$–$C_6$ alkyl or aryl;
m and n are each independently integers from 0–4;
W is a linking moiety selected from the group consisting of a bond, a $C_2$–$C_{18}$ alkylidene group, a $C_3$–$C_{12}$ cycloalkylidene group, a carbon atom optionally substituted by one or two hydrogen atoms or one or two $C_6$–$C_{10}$ aryl groups or one or two $C_1$–$C_{18}$ alkyl groups, an oxygen atom, a sulfur atom, a sulfonyl (SO$_2$) group and a carbonyl (CO) group;

and r is an integer from 1–15;
with a silicone-containing bisphenol having structure V

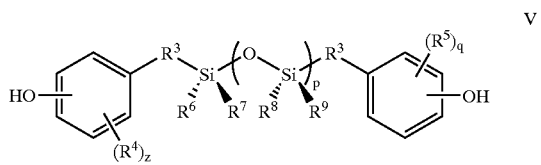

wherein $R^3$ is a $C_2$–$C_{10}$ alkylene group optionally substituted by one or more $C_1$–$C_{10}$ alkyl or one or more aryl groups, an oxygen atom or an oxyalkyleneoxy moiety

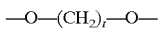

or an oxyalkylene moiety

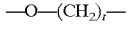

wherein t is an integer from 2–20;
R$^4$ and R$^5$ are each independently at each occurrence $C_1$–$C_6$ alkoxy, $C_1$–$C_6$ alkyl or aryl;
z and q are independently integers from 0–4;
R$^6$, R$^7$, R$^8$ and R$^9$ are each independently at each occurrence $C_1$–$C_6$ alkyl, aryl, $C_2$–$C_6$ alkenyl, cyano, trifluoropropyl or styrenyl; and
p is an integer from 0–20 wherein R$^6$, R$^7$, R$^8$ and R$^9$ are each independently at each occurrence $C_1$–$C_6$ alkyl, aryl, $C_2$–$C_6$ alkenyl, cyano, trifluoropropyl or styrenyl; and p is an integer from about 5 to about 30.

6. A method according to claim 5 wherein said bischloroformate having structure IV is prepared by reacting at least one bisphenol selected from the group from the group consisting of 2,2-bis(4-hydroxyphenyl)propane (BPA); 2,2-bis(4-hydroxyphenyl)butane; 2,2-bis(4-hydroxyphenyl)pentane; 2,2-bis(4-hydroxy-3-methylphenyl)propane; 2,2-bis(3-ethyl-4-hydroxyphenyl)propane; 1,1-bis(4-hydroxy-3-methylphenyl)cyclohexane; 1,1-bis(4-hydroxy-3-methylphenyl)cyclopentane; and 1,1-bis(4-hydroxy-3-methylphenyl)cycloheptane, with excess phosgene at a pH in a range of between about 8 and about 10.5 in the presence of a water immiscible solvent and a phase transfer catalyst.

7. A method according to claim 5 wherein said siloxane-containing bisphenol having structure V is a siloxane-containing bisphenol comprising between about 5 and about 30 Me$_2$SiO units, said siloxane-containing bisphenol being selected from the group consisting of eugenol siloxane bisphenol; 4-allyl-2-methylphenol siloxane bisphenol; 4-allylphenol siloxane bisphenol; 2-allylphenol siloxane bisphenol; 4-allyloxyphenol siloxane bisphenol; and 4-vinylphenol siloxane bisphenol.

8. A method according to claim 1 wherein step (B) comprises reacting with phosgene under interfacial conditions, the intermediate silicone copolycarbonate having a random structure with phosgene, at least one bisphenol having structure III

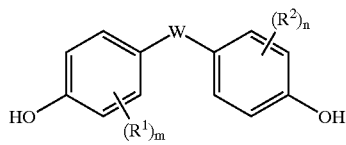

wherein $R^1$ and $R^2$ are each independently at each occurrence halogen, $C_1$–$C_6$ alkyl or aryl;
m and n are each independently integers from 0–4;
W is a linking moiety selected from the group consisting of a bond, a $C_2$–$C_{18}$ alkylidene group, a $C_3$–$C_{12}$ cycloalkylidene group, a carbon atom optionally substituted by one or two hydrogen atoms or one or two $C_6$–$C_{10}$ aryl groups or one or two $C_1$–$C_{18}$ alkyl groups, an oxygen atom, a sulfur atom, a sulfonyl ($SO_2$) group and a carbonyl (CO) group;

and at least silicone-containing bisphenol V

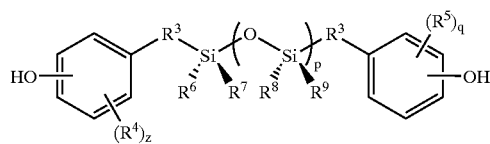

wherein $R^3$ is a $C_2$–$C_{10}$ alkylene group optionally substituted by one or more $C_1$–$C_{10}$ alkyl or one or more aryl groups, an oxygen atom or an oxyalkyleneoxy moiety

or an oxyalkylene moiety

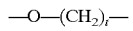

wherein t is an integer from 2–20;

$R^4$ and $R^5$ are each independently at each occurrence $C_1$–$C_6$ alkoxy, $C_1$–$C_6$ alkyl or aryl;

z and q are independently integers from 0–4;

$R^6$, $R^7$, $R^8$ and R9 are each independently at each occurrence $C_1$–$C_6$ alkyl, aryl, $C_2$–$C_6$ alkenyl, cyano, trifluoropropyl or styrenyl; and p is an integer from 0–20. wherein $R^6$, $R^7$, $R^8$ and $R^9$ are each independently at each occurrence $C_1$–$C_6$ alkyl, aryl, $C_2$–$C_6$ alkenyl, cyano, trifluoropropyl or styrenyl; and p is an integer from about 5 to about 30.

9. A method according to claim 8 wherein said bisphenol having structure III is selected from the group consisting of 2,2-bis(4-hydroxyphenyl)propane (BPA); 2,2-bis(4-hydroxyphenyl)butane; 2,2-bis(4-hydroxyphenyl)pentane; 2,2-bis(4-hydroxy-3-methylphenyl)propane; 2,2-bis(3-ethyl-4-hydroxyphenyl)propane; 1,1-bis(4-hydroxy-3-methylphenyl)cyclohexane; 1,1-bis(4-hydroxy-3-methylphenyl)cyclopentane; and 1,1-bis(4-hydroxy-3-methylphenyl)cycloheptane.

10. A method according to claim 8 wherein said silicone-containing bisphenol V is a siloxane-containing bisphenol comprising between about 5 and about 30 $Me_2SiO$ units, said siloxane-containing bisphenol being selected from the group consisting of eugenol siloxane bisphenol; 4-allyl-2-methylphenol siloxane bisphenol; 4-allylphenol siloxane bisphenol; 2-allylphenol siloxane bisphenol; 4-allyloxyphenol siloxane bisphenol; and 4-vinylphenol siloxane bisphenol.

11. A method according to claim 1 wherein step (B) comprises reacting under interfacial conditions the intermediate silicone copolycarbonate having a blocky structure with at least one bischloroformate having structure IV

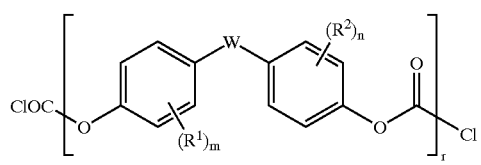

wherein $R^1$ and $R^2$ are each independently at each occurrence halogen, $C_1$–$C_6$ alkyl or aryl;

m and n are each independently integers from 0–4;

W is a linking moiety selected from the group consisting of a bond, a $C_2$–$C_{18}$ alkylidene group, a $C_3$–$C_{12}$ cycloalkylidene group, a carbon atom optionally substituted by one or two hydrogen atoms or one or two $C_6$–$C_{10}$ aryl groups or one or two $C_1$–$C_{18}$ alkyl groups, an oxygen atom, a sulfur atom, a sulfonyl ($SO_2$) group and a carbonyl (CO) group;

and r is an integer from 1–15;

and a silicone-containing bisphenol having structure V

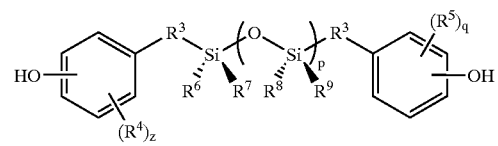

wherein $R^3$ is a $C_2$–$C_{10}$ alkylene group optionally substituted by one or more $C_1$–$C_{10}$ alkyl or one or more aryl groups, an oxygen atom or an oxyalkyleneoxy moiety

or an oxyalkylene moiety

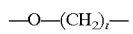

wherein t is an integer from 2–20;

$R^4$ and $R^5$ are each independently at each occurrence $C_1$–$C_6$ alkoxy, $C_1$–$C_6$ alkyl or aryl;

z and q are independently integers from 0–4;

$R^6$, $R^7$, $R^8$ and $R^9$ are each independently at each occurrence $C_1$–$C_6$ alkyl, aryl, $C_2$–$C_6$ alkenyl, cyano, trifluoropropyl or styrenyl; and p is an integer from about 5 to about 30.

12. A method according to claim 11 wherein said bischloroformate having structure IV is prepared by reacting at least one bisphenol selected from the group from the group consisting of 2,2-bis(4-hydroxyphenyl)propane (BPA); 2,2-bis(4-hydroxyphenyl)butane; 2,2-bis(4-hydroxyphenyl)pentane; 2,2-bis(4-hydroxy-3-methylphenyl)propane; 2,2-bis(3-ethyl-4-hydroxyphenyl)propane; 1,1-bis(4-hydroxy-3-methylphenyl)cyclohexane; 1,1-bis(4-hydroxy-3-methylphenyl)cyclopentane; and 1,1-bis(4-hydroxy-3-methylphenyl)cycloheptane, with excess phosgene at a pH in a range of between about 6 and about 10.5 in the presence of a water immiscible solvent and a phase transfer catalyst.

13. A method according to claim 11 wherein said siloxane-containing bisphenol having structure V is a siloxane-containing bisphenol comprising between about 5 and about 30 $Me_2SiO$ units, said siloxane-containing bisphenol being selected from the group consisting of eugenol siloxane bisphenol; 4-allyl-2-methylphenol siloxane bisphenol; 4-allylphenol siloxane bisphenol; 2-allylphenol siloxane bisphenol; 4-allyloxyphenol siloxane bisphenol; and 4-vinylphenol siloxane bisphenol.

14. A method according to claim 1 wherein said product formed in the second step comprises the random substructure in an amount expressed as a weight percentage of the random substructure relative to a total weight of said product, and said product formed in the second step comprises the blocky substructure in an amount expressed as a weight percentage of the blocky substructure relative to a total weight of said product, the amount of said random substructure being between about 0.001 and about 1000 times the amount of blocky substructure.

15. A method according to claim 14 wherein said product comprises about between about 1 and about 99 percent by weight random substructure and about 99 to about 1 percent weight percent by weight blocky substructure.

16. A method according to claim 15 wherein said product comprises about between about 40 and about 60 percent by weight random substructure and about 60 to about 40 percent weight percent by weight blocky substructure.

17. A method according to claim 1 wherein said silicone copolycarbonate comprises between about 0.1 and about 20 percent by weight percent siloxane.

18. A method for making a silicone copolycarbonate, said silicone copolycarbonate comprising both random and blocky substructures, said method comprising:

Step (A) preparing in a first step an intermediate silicone copolycarbonate by reacting bisphenol A bischloroformate under interfacial conditions with eugenol siloxane bisphenol having between about 5 and about 30 $Me_2SiO$ units, said intermediate silicone copolycarbonate having a random structure; and Step (B) reacting said intermediate silicone copolycarbonate with a bisphenol compound and phosgene in a second step to form a product silicone copolycarbonate, said second step being one which compliments the first step, said second step providing a product silicone copolycarbonate which has both a random substructure and a blocky substructure.

19. A method according to claim 18 wherein step (B) comprises reacting under interfacial conditions the intermediate silicone copolycarbonate having a random structure with phosgene, bisphenol A and eugenol siloxane, said eugenol siloxane comprising between about 5 and about 30 $Me_2SiO$ units.

* * * * *